United States Patent
Chang et al.

(10) Patent No.: US 7,740,461 B2
(45) Date of Patent: Jun. 22, 2010

(54) APPARATUS AND METHOD FOR MANUFACTURING POLYMERIC FIBRILS

(75) Inventors: Haw-Jer Chang, Hsinchuang (TW); Hung-En Chen, Taipei Hsien (TW); Po-Hsiung Huang, Taipei (TW); Jen-Hsiung Lee, Panchiao (TW); Ching-Hui Tseng, Taoyuan (TW)

(73) Assignee: Taiwan Textile Research Institute, Tu-Chen, Taipei Hsien (TW)

( * ) Notice: Subject to any disclaimer, the term of this patent is extended or adjusted under 35 U.S.C. 154(b) by 1364 days.

(21) Appl. No.: 11/190,720

(22) Filed: Jul. 27, 2005

(65) Prior Publication Data

US 2006/0024399 A1 Feb. 2, 2006

(30) Foreign Application Priority Data

Jul. 29, 2004 (TW) .............................. 93122776 A

(51) Int. Cl.
*D01D 5/18* (2006.01)
*D04H 1/72* (2006.01)

(52) U.S. Cl. .................. 425/8; 264/8; 264/10; 264/13; 264/465; 264/466; 264/467; 425/83.1; 425/174.8 E; 425/382.2; 425/464

(58) Field of Classification Search ............. 425/8, 425/83.1, 174.6, 174.8 E, 382.2, 464; 264/8, 264/10, 13, 465, 466, 467
See application file for complete search history.

(56) References Cited

U.S. PATENT DOCUMENTS

| 3,475,198 | A | * | 10/1969 | Drum | 427/482 |
|---|---|---|---|---|---|
| 3,997,307 | A | * | 12/1976 | Faulkner et al. | 65/470 |
| 4,650,506 | A | * | 3/1987 | Barris et al. | 55/487 |
| 4,999,080 | A | * | 3/1991 | Boich | 156/441 |
| 6,110,590 | A | | 8/2000 | Zarkoob et al. | 428/364 |
| 6,616,435 | B2 | | 9/2003 | Lee et al. | 425/83.1 |
| 2003/0211135 | A1 | | 11/2003 | Greenhalgh et al. | 424/443 |

* cited by examiner

*Primary Examiner*—Robert B Davis
*Assistant Examiner*—Joseph Leyson
(74) *Attorney, Agent, or Firm*—Occhiuti Rohlicek & Tsao LLP

(57) ABSTRACT

An electrospinning apparatus is described. The electrospinning apparatus has a rotary nozzle mechanism that moves simultaneously along a non-linear track for forming polymeric fibrils, so that the polymeric fibrils can be piled to form a uniform web on a receiving carrier from any receiving angle. Therefore, the electrospinning apparatus resolves problems of the prior polymeric fibrils, such as various distribution and slow production rate. In addition, a method of manufacturing polymeric fibrils in the aforementioned electrospinning apparatus is further described.

33 Claims, 11 Drawing Sheets

US 7,740,461 B2

APPARATUS AND METHOD FOR MANUFACTURING POLYMERIC FIBRILS

RELATED APPLICATIONS

The present application is based on, and claims priority from, Taiwan Application Serial Number 93122776, filed Jul. 29, 2004, the disclosure of which is hereby incorporated by reference herein in its entirety.

FIELD OF THE INVENTION

The present invention relates to an electrospinning apparatus and a method for manufacturing polymeric fibrils in mass production, and more particularly, to an electrospinning apparatus with a rotary nozzle mechanism and a method for manufacturing polymeric fibrils.

BACKGROUND OF THE INVENTION

The electrospinning technology is for manufacturing nanofibers. The principle of the electrospinning technology is to provide a driving force generated by an electrical field between a positive and a negative electrodes, so as to overcome surface tension and viscosity of a polymer solution. In addition, streams of polymer solution ejected from a nozzle are mutually repulsive because they carry the same charge; when the solvent evaporates, ultra-thin fibers are formed. The process is also called fiber electrospinning. Comparing with the fibers produced by the prior spinning technology in diameters of several micrometers (μm), the polymeric fibrils produced by the electrospinning technology can achieve a purpose of fiber thinning, due to mechanical and electrostatic forces during the electrospinning process. Moreover, the fabric spun by the electrospinning method enjoys the advantages of having a more favored in higher porosity, larger surface area, and smaller pore size than those of conventional fabrics.

In U.S. Pat. No. 6,616,435, an apparatus of a polymer web formed by an electrospinning process is disclosed. The apparatus comprises: a barrel storing at least one kind of polymer material in a liquid state; a pump pressurizing and supplying the polymer material in the liquid state stored in the barrel; a spinning part for injecting the polymer material in the liquid state supplied by the pump through at least one charged nozzle and manufacturing thin fibers; a high voltage generator providing an electric charge for charging the polymer material discharged through the at least one nozzle of the spinning part to have one polarity; and a collector for piling and transferring the thin fibers to form the polymer web. The electrospinning apparatus has an automatic production ability operated with a plane conveyer belt.

In U.S. Pat. No. 6,110,590, a silk nanofiber composite network produced by forming a solution of silk fiber and hexafluoroisopropanol is disclosed. The silk solution has a concentration of about 0.2 to about 1.5 weight percent silk in hexafluoroisopropanol, thereby forming a non-woven network of nanofibers having a diameter in the range of about 2 to about 2000 nanometers (nm) for medical use.

In U.S. Publication No. 2003/0211135, a method of producing a composite film fibrous web having diameters averaging less than 100 micrometers by moving nozzles along X-Y axes is disclosed. The resultant product can be applied in, for example, fuel cells and medical supplies.

In brief, the polymeric fibrils can be produced with various diameters by controlling the system parameters of the electrospinning apparatus such as, for example, molecular weight, viscosity, conductivity, surface tension of the polymer solution, controlling operation parameters such as potential of the discharging electrode, flow rate of the polymer solution, the distance between electrodes, and temperature and humidity in the operation environment. However, an uneven web is produced by reciprocating the above nozzle. Reference is made to FIG. 1, which depicts a track of a nozzle on the receiving carrier in the prior art. When the nozzle 101 ejects the polymeric fibrils in a reciprocating way, the receiving carrier goes in a direction 109 vertical to the moving direction of the nozzle. The resultant web is formed with dense polymeric fibrils distributed in a region M and thin polymeric fibrils distributed out of the region M. Reference is made to FIG. 2, which depicts another track of another nozzle on the receiving carrier in the prior art. When the nozzle 101 also ejects the polymeric fibrils in reciprocating way, the receiving carrier goes in a direction 109 vertical to the moving direction of the nozzle. The resultant web is formed with dense polymeric fibrils distributed in a region N and thin polymeric fibrils distributed out of the region N.

In addition to the problem of unevenness in the polymer web produced by the U.S. Pat. No. 6,616,435, there is further an issue of slow production rates for other technologies. For examples, a unit of equipment disclosed in U.S. Pat. No. 6,110,590 is merely an experimental one in the laboratory without continuous production ability. Moreover, the equipment disclosed in U.S. Publication No. 2003/0211135 has a slow production rate for the purpose of uniform distribution. Furthermore, the web produced by such polymeric fibrils produced by the above methods cannot completely satisfy the requirements for thinner diameter, uniform distribution, and higher production rate.

Hence, there is an urgent need for an electrospinning apparatus and method of manufacturing polymeric fibrils, so as to resolve the problems of uneven distribution, slow production rate and so on.

SUMMARY OF THE INVENTION

It is an aspect of the present invention to provide an electrospinning apparatus. The electrospinning apparatus utilizes a rotary supporting device. A distance between outlets of the polymer solution of the rotary supporting device can be freely adjusted, and an outlet of the rotary supporting device moves along a non-linear track, so that the polymeric fibrils can be formed as a uniform web. The electrospinning apparatus further has a transporting device for producing the uniform web continuously or in batches. Therefore, the electrospinning apparatus resolves the problems, such as uneven distribution and slow production rate, of the prior polymeric fibrils.

It is another aspect of the present invention to provide a rotary nozzle mechanism. The rotary nozzle mechanism is suitable for an electrospinning apparatus. The rotary supporting device moves along a non-linear track, so that the polymeric fibrils can be formed into a uniform web at any receiving angle on a receiving carrier. The rotary supporting device of the invention improves problems of the prior polymeric fibrils, such as uneven distribution and slow production rate.

It is a further aspect of the present invention to provide a method of manufacturing polymeric fibrils utilizing a rotary nozzle mechanism for manufacturing the polymeric fibrils. Outlets of the polymer solution move along a non-linear track, so that the polymeric fibrils can be formed into a uniform web.

It is a still another aspect of the present invention to provide a method of manufacturing polymeric fibrils utilizing outlets of the polymer solution of the rotary supporting device simultaneously moving along a non-linear track. The polymeric fibrils can be emitted at any receiving angle to form a uniform web on a collector, while employing a rotary supporting device of an electrospinning apparatus manufacturing ultra-thin polymeric fibrils. Moreover, the method of manufacturing polymeric fibrils is also performed continuously or in batches, and hence capable of achieving automatic production.

According to the aforementioned aspect of the present invention, an electrospinning apparatus is provided. The electrospinning apparatus comprises at least one rotary supporting device including at least one outlet, wherein a discharging electrode is disposed in the outlet and a polymer solution is introduced by a duct. A collector is located below the rotary supporting device and has a surface to face the outlet. When a voltage is applied to the discharging electrode, the polymer solution is ejected from the outlet, so as to form charged polymeric fibrils and pile the same on a receiving carrier above a collector. Simultaneously, the receiving carrier advances along a direction and the outlet moves along a non-linear track, thus forming a web on a surface of the receiving carrier.

Preferably, the rotary supporting device is at least one supporting arm or a plate.

Preferably, the non-linear track is a circular track, an elliptic track or a wavy track.

Preferably, the other end of the rotating shaft serves as a center for the end of the rotating shaft, simultaneously revolving the rotating shaft to eject the polymeric fibrils at a tilt angle with respect to a vertical direction or at a fixed angle.

Preferably, nozzles are arranged on one end and the other end of the rotary supporting device, respectively, the outlets are separated from each other by a space, and the space is freely adjustable and less than or equal to the supporting device in length.

Preferably, a shape of the collector is a dish, a circle, an ellipse, a rectangle, a three-dimensional shape or combinations thereof.

According to another aspect of the present invention, a rotary nozzle mechanism suitable for an electrospinning apparatus is provided. The rotary nozzle mechanism comprises a rotating shaft that spins around an axis thereof and at least one supporting device that has at least one outlet and is pivoted on an end of the rotating shaft. The outlet is electrically connected to a discharging electrode and with a polymer solution is introduced by a duct. When a voltage is applied to the discharging electrode for ejecting the polymer solution from the outlet, charged polymeric fibrils are formed and piled on a receiving carrier above a collector, while the receiving carrier advances simultaneously along a direction and the outlet moves along a non-linear track, thus forming a web on a surface of the receiving carrier.

According to the further aspect of the present invention, a method of manufacturing polymeric fibrils is provided. A rotary nozzle mechanism is firstly provided, which comprises a rotating shaft that spins around an axis thereof, and at least one supporting device that has at least one outlet and is pivoted on an end of the rotating shaft. The outlet is electrically connected to a discharging electrode and a polymer solution is introduced by a duct. Then, when a voltage is applied to the discharging electrode for ejecting the polymer solution from the outlet, charged polymeric fibrils are formed and piled on a receiving carrier above a collector. Simultaneously, the receiving carrier advances along a direction and the outlet moves along a non-linear track, thus forming a web on a surface of the receiving carrier.

According to the still another aspect of the present invention, there is provided a method of manufacturing polymeric fibrils is provided. An electrospinning apparatus is first provided, which comprises at least one rotary supporting device including at least one outlet, wherein a discharging electrode is disposed in the outlet and a polymer solution is introduced by a duct; and a collector located below the rotary supporting device. Then, a voltage is applied to the discharging electrode for ejecting the polymer solution from the outlet, forming charged polymeric fibrils and piling the same on a receiving carrier above a collector. Simultaneously, the receiving carrier advances along a direction and the outlet moves along a non-linear track, thus forming a web on a surface of the receiving carrier.

The method of manufacturing polymeric fibrils performed by employing the electrospinning apparatus utilizes a rotary nozzle mechanism moving along a non-linear track, so that the ultra-thin polymeric fibrils can be formed at any receiving angle, such as horizontal, vertical or any angle, to be piled to form the uniform web on the receiving carrier. Therefore, the problems of the prior polymeric fibrils, such as various distribution and slow production rate, can be resolved.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
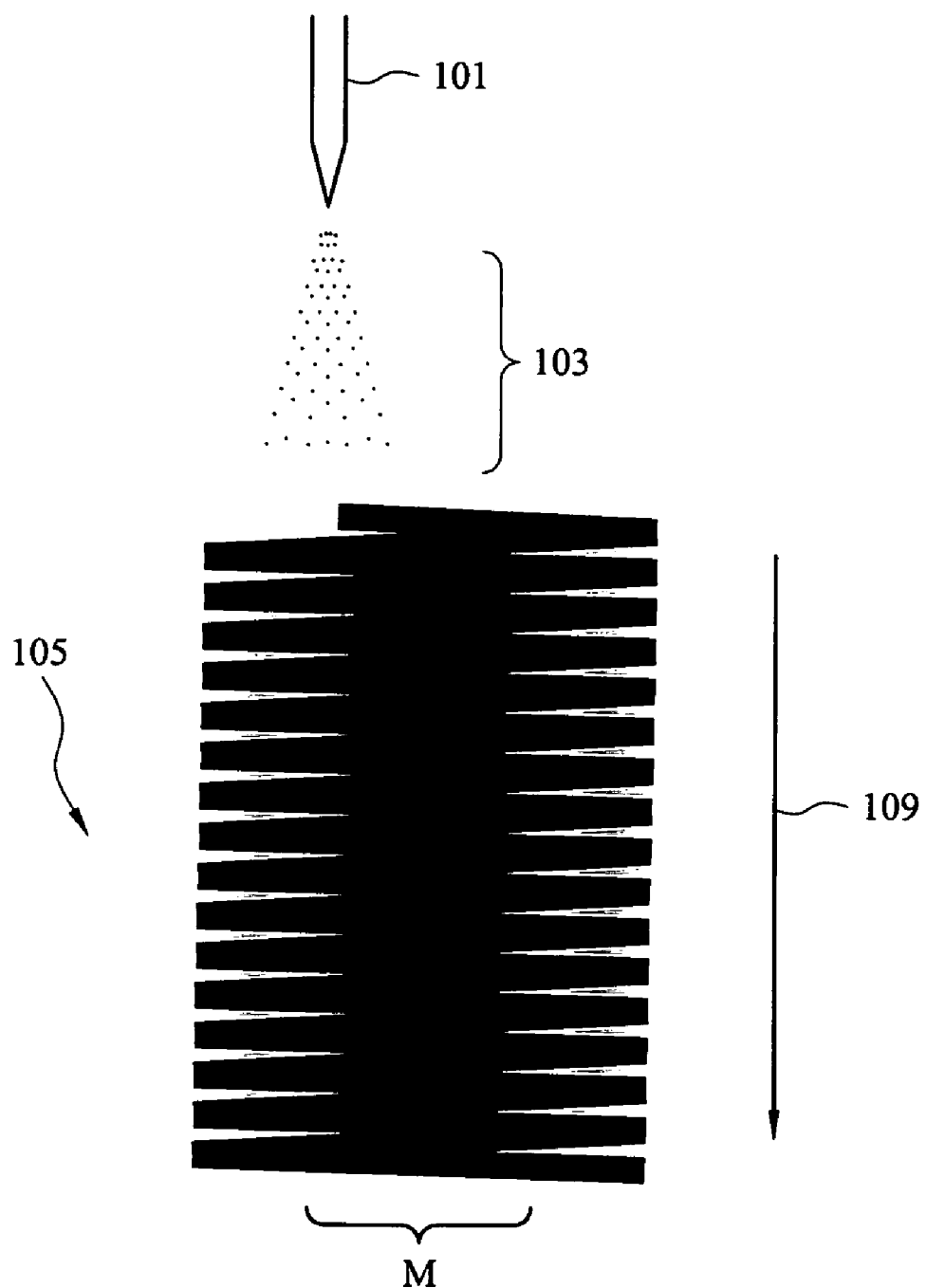
FIG. 1 depicts a track of a nozzle on the receiving carrier in the prior art.
Figure 2:
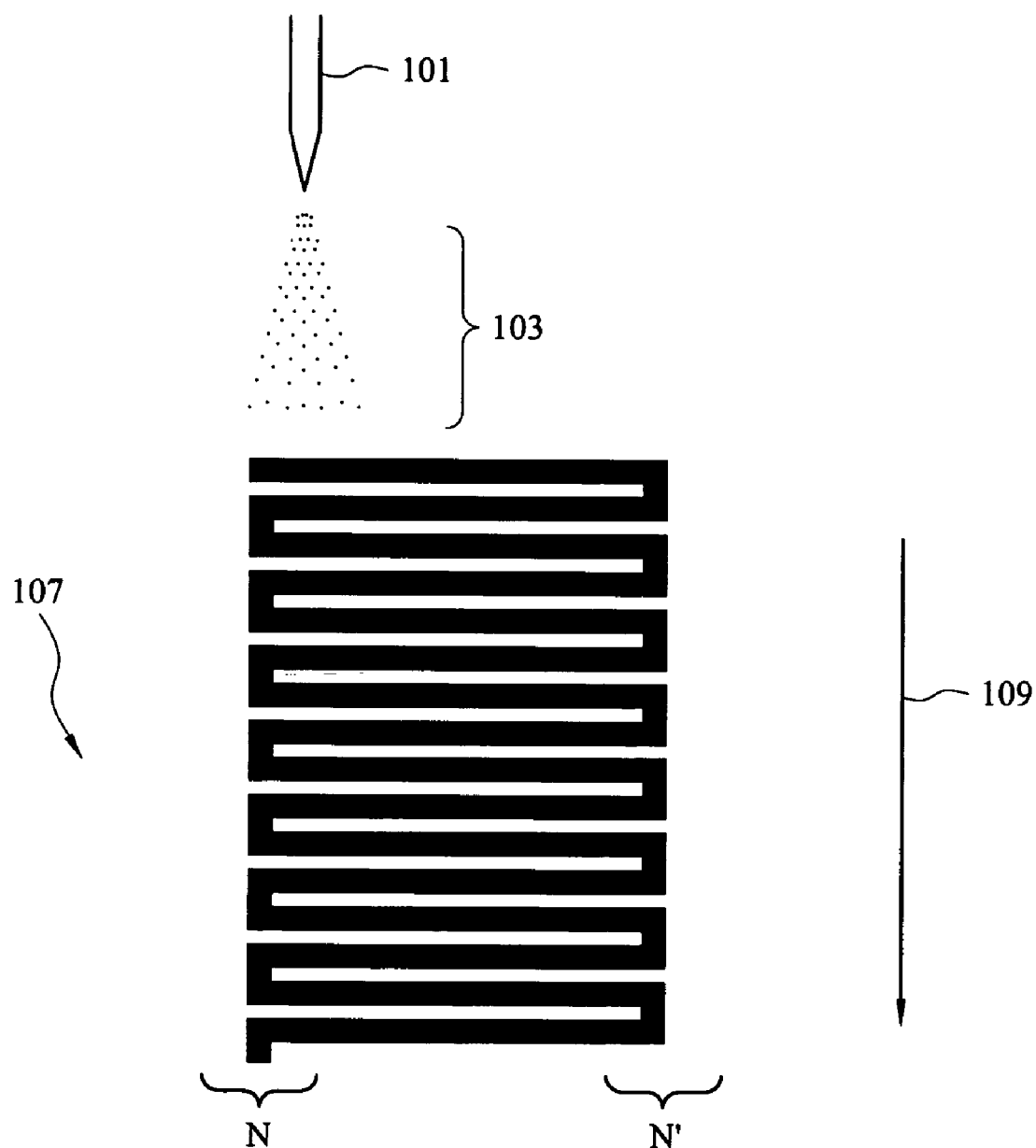
FIG. 2 depicts another track of another nozzle on the receiving carrier in the prior art.
Figure 3:
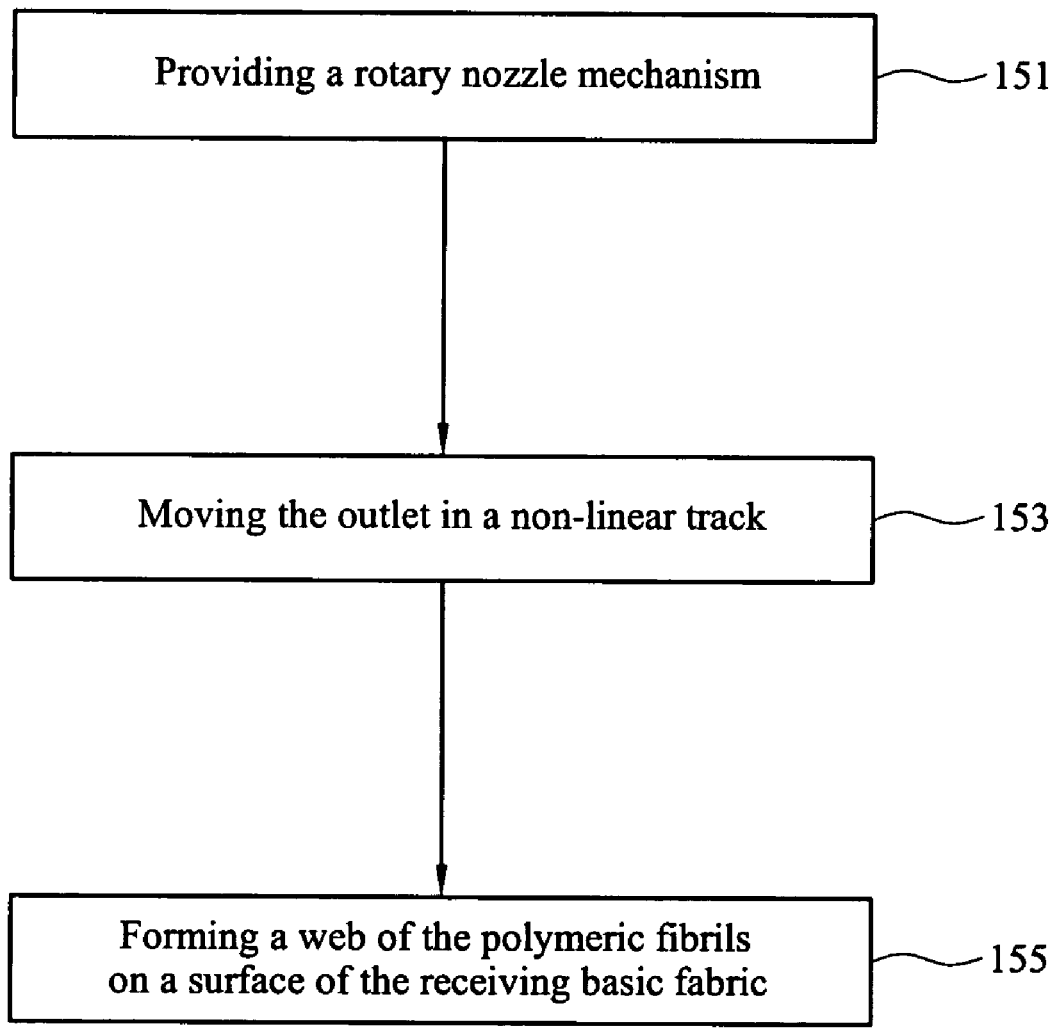
FIG. 3 is a flow chart of the method of manufacturing polymeric fibrils according to a preferred embodiment of the invention.

The present invention provides a method of manufacturing polymeric fibrils. Reference is made to FIG. 3, which is a flow chart of the method of manufacturing polymeric fibrils according to a preferred embodiment of the invention. A rotary nozzle mechanism is provided as illustrated in the step 151, which is located in an electrospinning apparatus and comprises a rotating shaft that spins around an axis thereof, and at least one supporting device that has at least one outlet and is pivoted on an end of the rotating shaft. In another example, at least one rotary supporting device is also provided, which is also located in the electrospinning apparatus and has at least one outlet. The outlet is electrically connected to a discharging electrode and a polymer solution is introduced by a duct. The rotating shaft spins around an axis thereof. Then, as illustrated in the step 153, a voltage is applied to the discharging electrode for ejecting the polymer solution from the outlet, so as to form charged polymeric fibrils and pile the same on a receiving carrier above a collector. Simultaneously, the receiving carrier advances along a direction and the outlet moves along a non-linear track, thus forming a web on a surface of the receiving carrier, as illustrated in the step 155.

For operating in coordination with the aforementioned process, the invention further provides an electrospinning apparatus, which utilizes a rotary nozzle mechanism moving along a non-linear track, so that the resultant nano-scale polymeric fibrils can be piled to form a uniform web on the receiving carrier at any receiving angle. The following electrospinning apparatus of the present invention is illustrated in detail by accompanying FIGS. 4 to 14.

Figure 4:
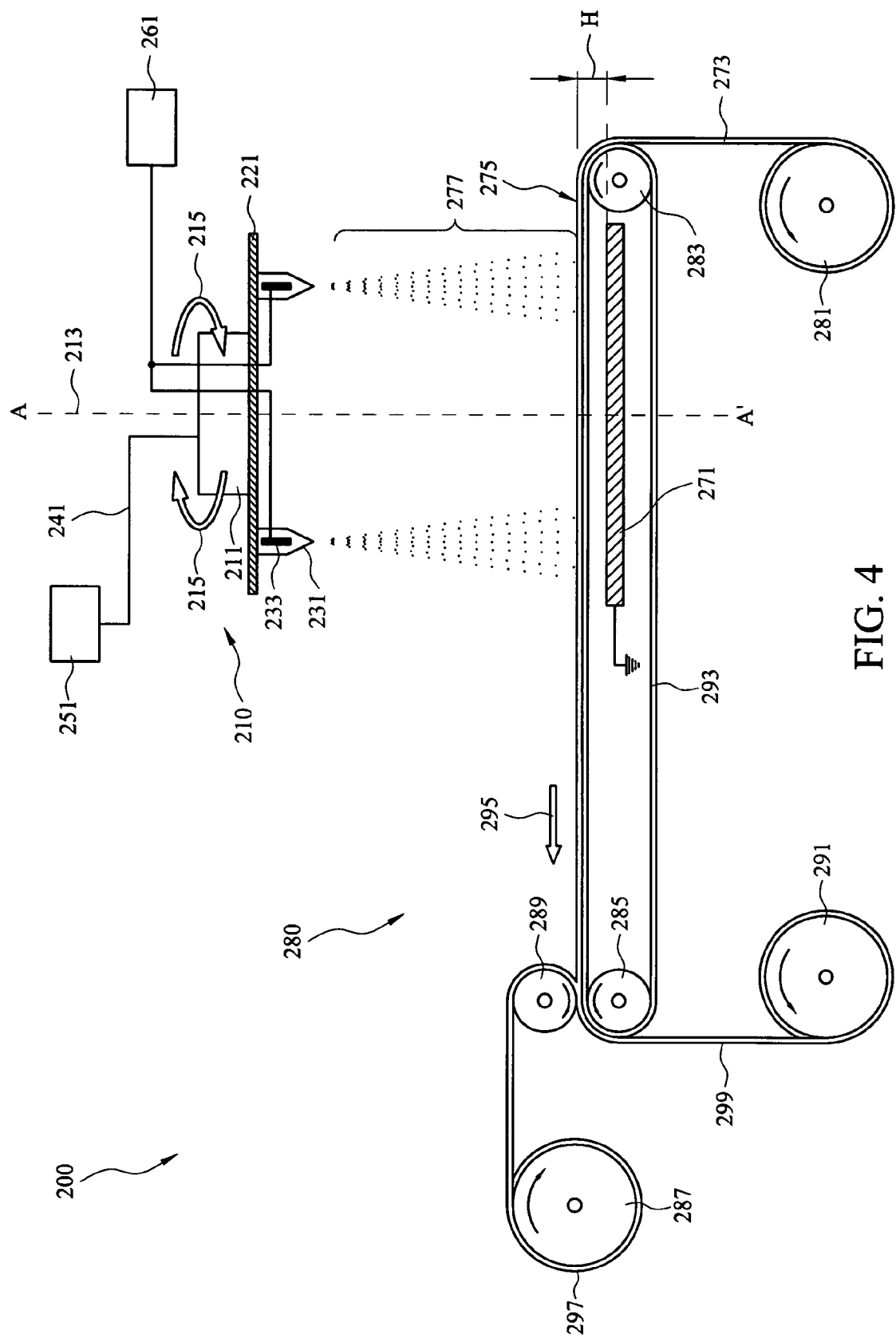
FIG. 4 depicts a side diagram of the electrospinning apparatus according to a preferred embodiment of the invention.

Reference is made to FIG. 4, which depicts a side diagram of the electrospinning apparatus according to a preferred embodiment of the invention. The electrospinning apparatus 200 comprises a rotary nozzle mechanism 210 comprising a rotating shaft 211 that spins around an axis 213 thereof along a direction indicated by an arrow 215. A middle point of a supporting device 221, such as a supporting arm, is pivoted on an end of the rotating shaft 211. Alternatively, a plurality of supporting arms serve as supporting devices 221 and are pivoted on the same end of the rotating shaft 211 by respective middle points of the respective supporting arms, details of which are discussed later. At least one outlet is disposed on the supporting device 221. The outlet that is provided, such as a nozzle 231 or other type of outlet, is freely disposed on the supporting device 221. The outlet of the nozzle 231 is electrically connected to a discharging electrode 233 and a polymer solution is introduced from a polymer solution storing tank 251 by a duct 241.

A collector 271 is located below the rotary nozzle mechanism 210 as shown in FIG. 4. The collector 271 is typically grounded. When a voltage provided by a high-voltage power supply 261 is applied to the discharging electrode 233 of the rotary nozzle mechanism 210, a electric field is generated between the discharging electrode 233 and the collector 271, for ejecting the polymer solution 251 from the outlet of the nozzle 231, so as to form charged polymeric fibrils 277 and pile the same in the direction of the collector 271. A surface of the collector 271 facing the rotary nozzle mechanism 210 has a guiding pore for exhausting air (not shown), aiding in the proper stacking of the polymeric fibrils 277. The guiding pore for exhausting air is provided by a structure that is hollow and has pores, and a material of the structure may be a metal or a metal-containing fabric.

As shown in FIG. 4, a receiving carrier 273 is located above the collector 271 in a predetermined height H for piling the polymeric fibrils 277, and the predetermined height H is in a range of 0 to 1 meter. A material of the receiving carrier 273 is not limited but depends on the requirements of the process. In addition, a surface 275 of the receiving carrier 273 may be a plane or a three-dimensional shape, and the surface 275 of the receiving carrier 273 is perforated or not. The polymeric fibrils 277 are formed into a web on the receiving carrier 273, and then dried at room temperature. Since the pores remaining within the web are very small, the receiving carrier with the web can serve as a high-efficiency filtration material. For instance, when the surface 275 of the receiving carrier 273 is a plane, the receiving carrier with the web can be manufactured into, for example, flat facemasks and filter sheets. When the surface 275 of the receiving carrier 273 is a three-dimensional shape, the receiving carrier with the web can be manufactured into, for example, three-dimensional facemasks, filtrating cartridges, and biomedical materials.

The electrospinning apparatus 200 of the present invention further utilizes a transporting device 280 for continuously transporting the receiving carrier 273 in a direction indicated by an arrow 295. As shown in the configuration of FIG. 4, the transporting device 280 comprises rollers 281, 283, 285, 287, 291 and a roller presser 289. The roller 281 rolls up the whole tape of the receiving carrier 273. The rollers 283, 285 and a conveyer mesh belt 293 lead the receiving carrier 273 to pile the polymeric fibrils 277 above the collector 271 in the direction indicated by the arrow 295, thereby forming the web on the surface 275 of the receiving carrier 273. And optionally, the roller presser 289 serves to press a face fabric 297 onto the receiving carrier 273 with the web, for forming a composite filtration material 299, in which the roller 287 rolls up the whole tape of the face fabric 297. Afterwards, the resultant composite filtration material 299 is received by the roller 291. The electrospinning apparatus 200 with the transporting device 280 can be operated continuously or in batches, and hence is capable of meeting the requirement for automatic production.

Figure 5:
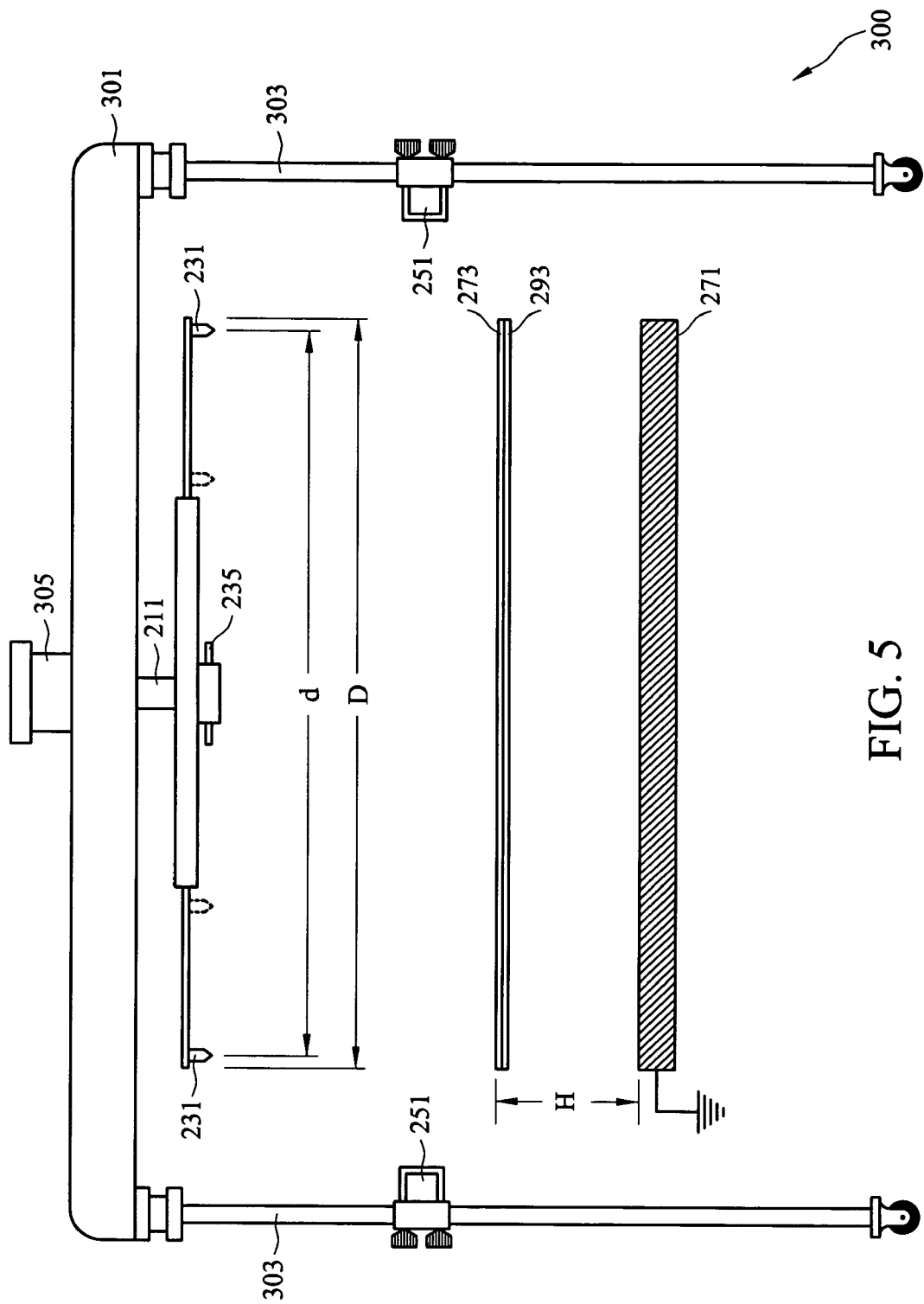
FIG. 5 depicts a cross-sectional view along the line AA' in FIG. 4.

Reference is made to FIG. 5, which depicts a cross-sectional view along the line AA' in FIG. 4. In an embodiment of the present invention, the rotary nozzle mechanism 210 can be fixed on a stand 300. The stand 300 comprises a upper portion 301 and a support 303 for support thereof. The upper portion 301 serves to fix the rotary nozzle mechanism 210. The polymer solution storing tank 251 is freely located on the support 303, and the support 303 can be designed to be moveable. The polymer solution storing tank 251 is connected to the outlet of the nozzle 231 by the duct (not shown). A motor 305 is further located on the top of the upper portion 301, and serves to drive the rotating shaft 211 of the rotary nozzle mechanism 210, so as to make the rotating shaft 211 rotate freely in one direction or more.

In FIG. 5, one end and the other end of the supporting device 221 pivoted on the rotating shaft 211 have nozzles 231, respectively, and the nozzles 231 are separated by a space d from each other. The space d is freely adjustable depending on requirements. For instance, the distance d is less than or equal to the supporting device 221 in length D. Moreover, nozzles 235 can be located underlying the connection of the supporting device 221, in which the outlets of the nozzles 235 can compress adequate gas to adjust a rate of extruding the polymeric fibrils.

Figure 6:
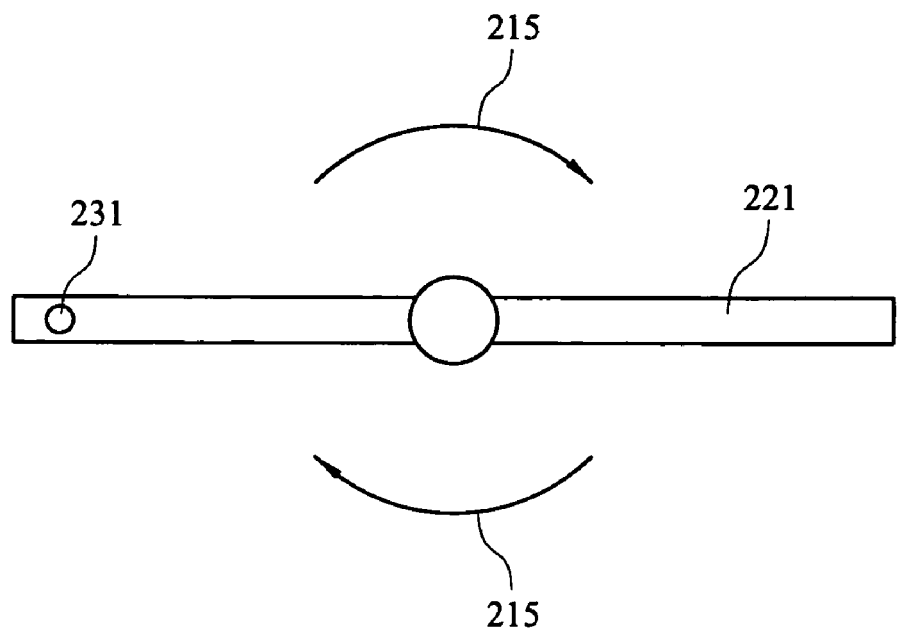
FIGS. 6 to 10 depict bottom views of the rotary nozzle mechanism according to several preferred embodiments of the present invention.
Figure 7:
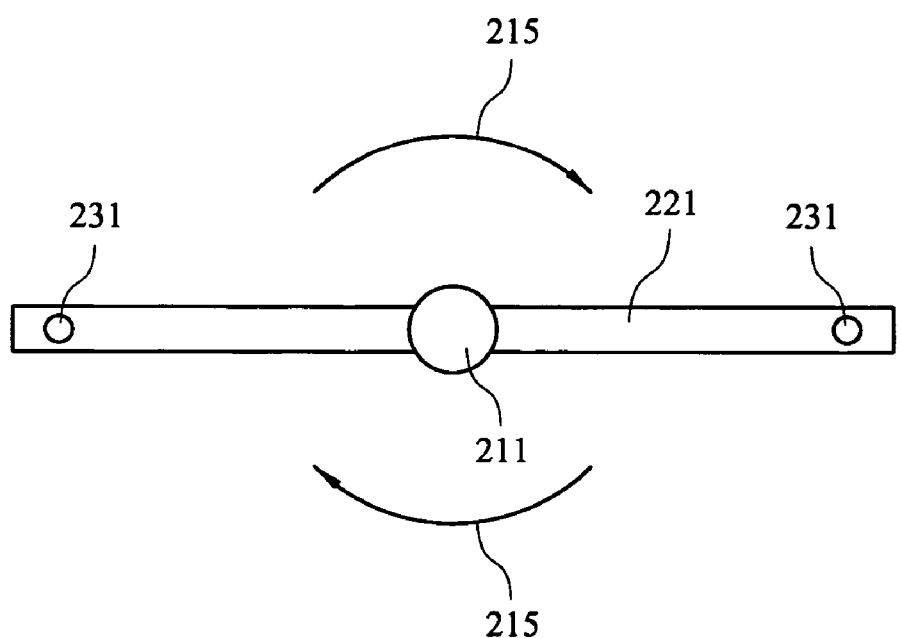
Figure 8:
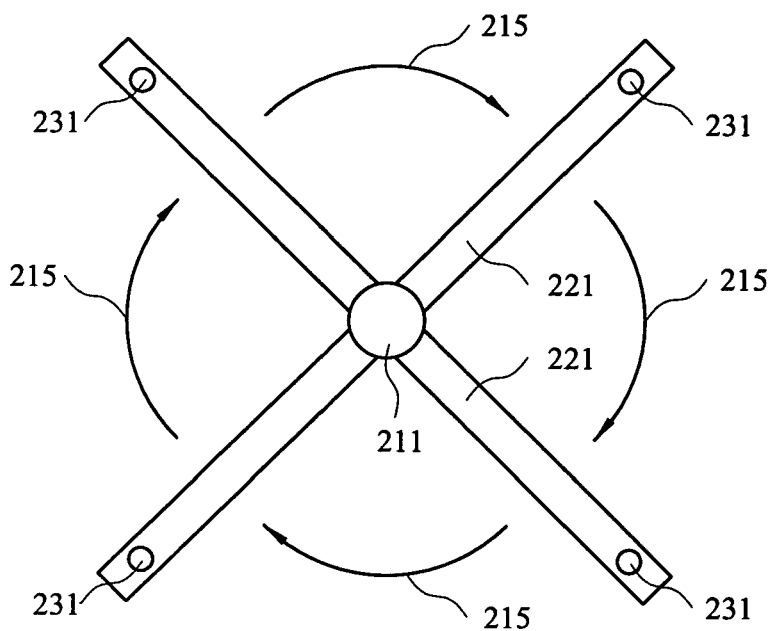
Figure 9:
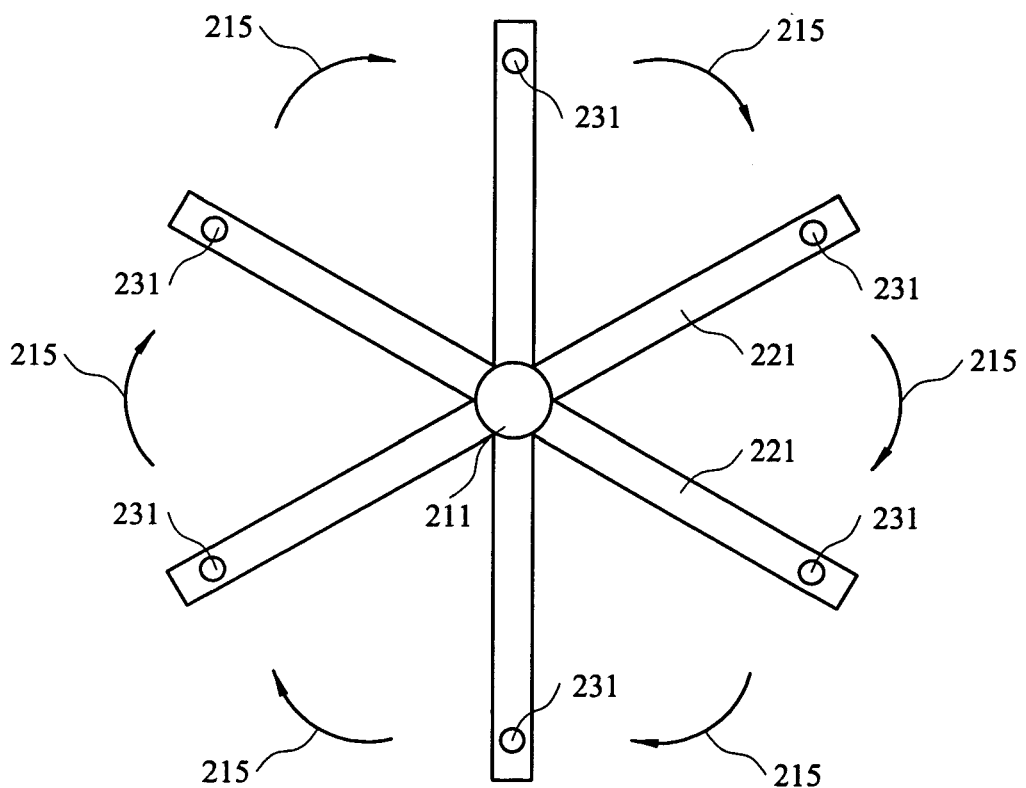
Figure 10:
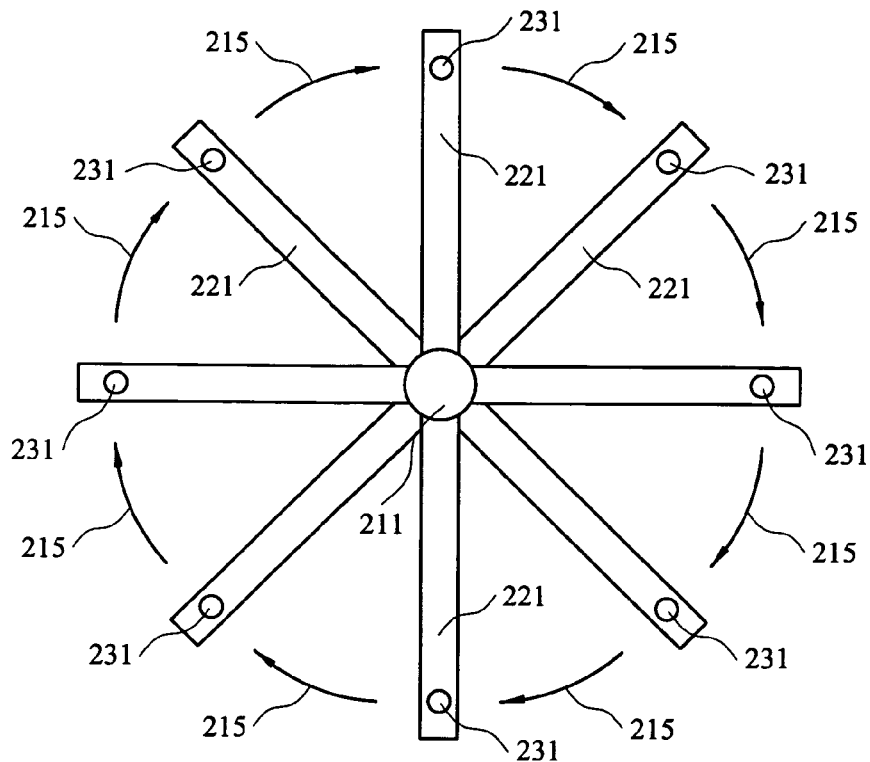

In a preferred embodiment of the present invention, the nozzle 231 is arranged on only one end of the supporting device 221, and performs a revolving motion driven by the rotating shaft 211 in a direction indicated by an arrow 215, as shown in a bottom view of FIG. 6. In another preferred embodiment of the present invention, the nozzles 231 are arranged on both ends of the supporting device 221, and perform the revolving motion driven by the rotating shaft 211 in the direction indicated by the arrow 215, as shown in a bottom view of FIG. 7. In a further preferred embodiment of the present invention, the nozzles 231 are arranged respectively on both ends of two supporting devices 221, and perform the revolving motion driven by the rotating shaft 211 in the direction indicated by the arrow 215, as shown in a bottom view of FIG. 8. It is reasonable to derive that the nozzles 231 are arranged respectively on both ends of three or four supporting devices 221, and perform the revolving motion driven by the rotating shaft 211 in the direction indicated by the arrow 215, as shown in bottom views of FIGS. 9 and 10.

However, as is understood by a person skilled in the art, the foregoing configurations of the rotary nozzle mechanism 210 of the present invention are merely illustrated exemplarily rather than limiting the number and the configuration of the nozzles 231 and the supporting devices 221. For example, the supporting device 221 can be any shape of a plate in addition to the supporting arm, so as to freely dispose nozzles 231 on the plate-form of the supporting device 221.

Figure 11:
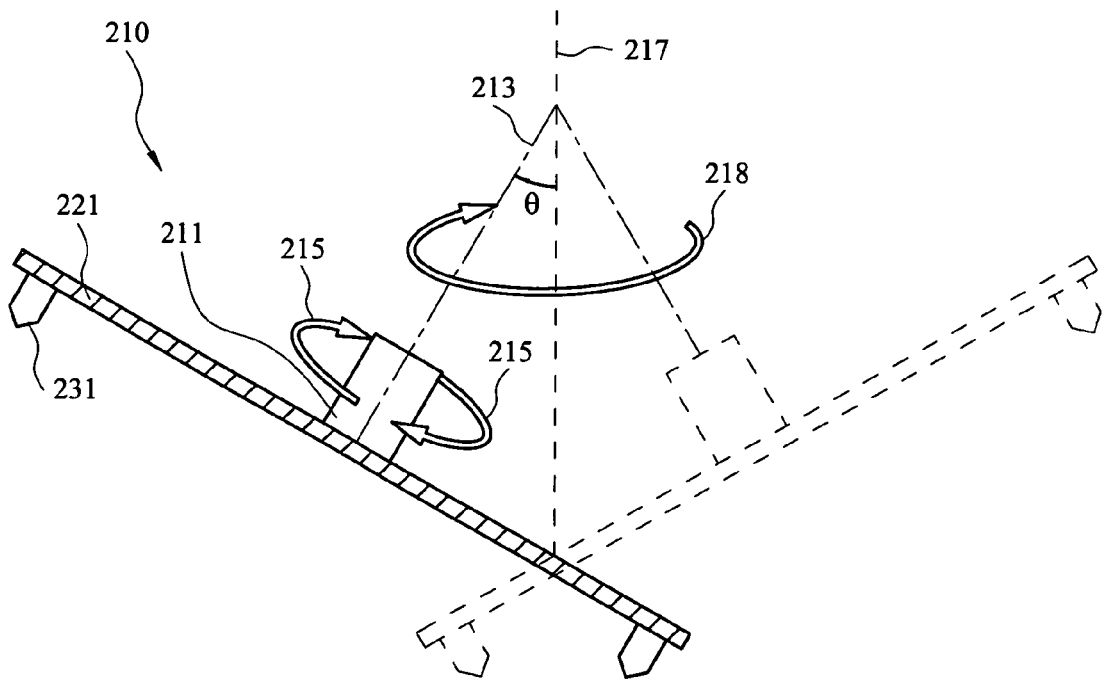
FIG. 11 depicts a rotary nozzle mechanism according to another embodiment of the present invention.
Figure 12:
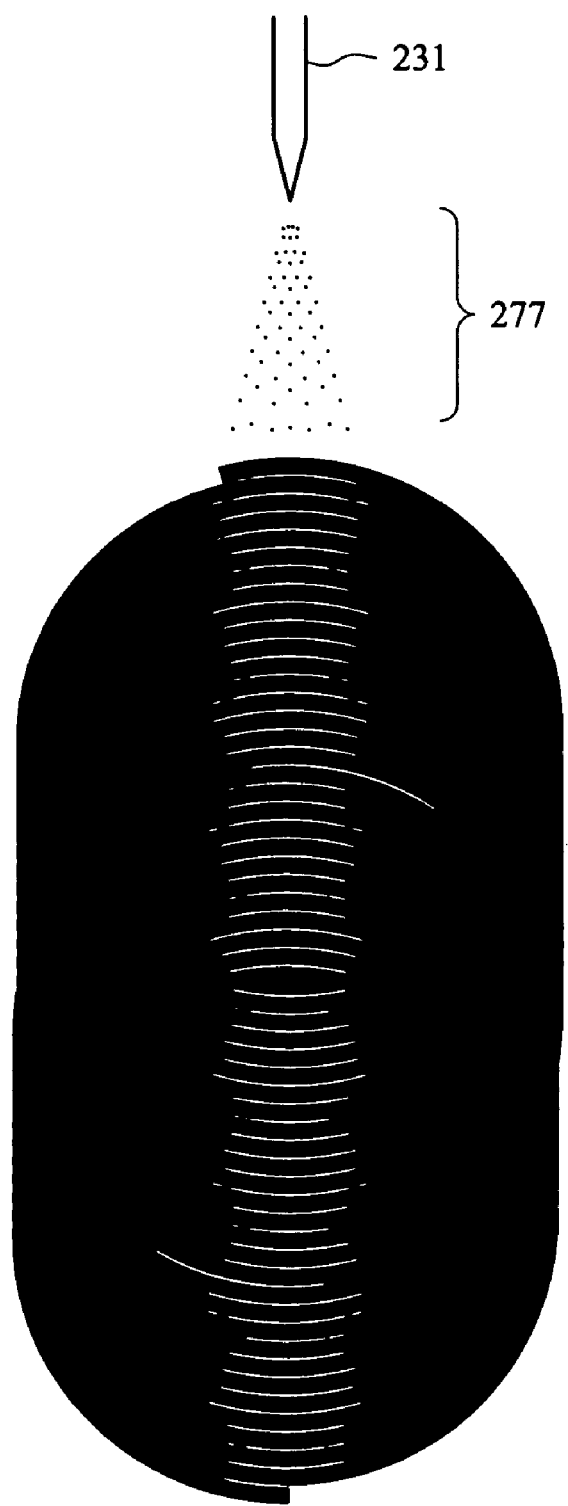
FIG. 12 depicts a track of a nozzle on the receiving carrier according to an embodiment of the present invention.
Figure 13:
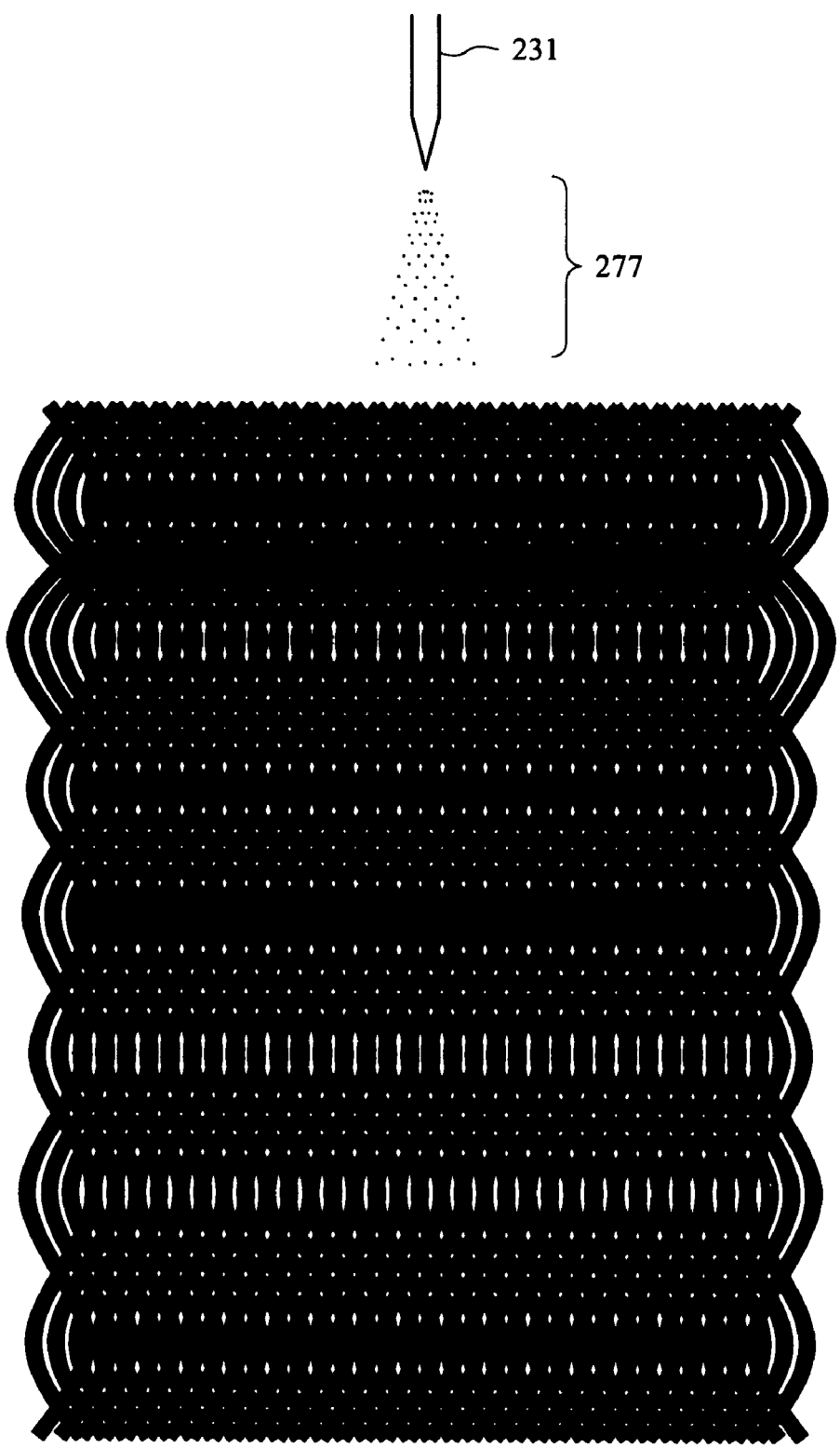
FIG. 13 depicts a track of a nozzle on the receiving carrier according to an another embodiment of the present invention.

It is worth mentioning that the rotary nozzle mechanism 210 of the present invention can rotate freely in one direction or more, so that the outlet of the nozzle 231 moves along a non-linear track. The non-linear track may be a circular track, an elliptic track or a wavy track. Therefore, the rotary nozzle mechanism 210 of the present invention utilizes gravitational and centrifugal forces to prevent the beading effect occurring in conventional polymeric fibril formation. Reference is made to FIG. 4 again; the rotating shaft 211 of the rotary nozzle mechanism 210 spins around the axis 231 in the direction indicated by the arrow 215. The axis 213 is vertical. Reference is made to FIG. 11, which depicts a rotary nozzle mechanism according to another embodiment of the present invention. The rotating shaft 211 of the rotary nozzle mechanism 210 spins around the axis 231 thereof in the direction indicated by the arrow 215. The rotating shaft 211 either spins around the axis 213 tilted at a tilt angle θ with respect to a vertical axis 217, or spins at the tilt angle θ and the axis 231 revolves simultaneously at the tilt angle θ with respect to a vertical direction. The tilt angle θ is in a range of 0 to 45 degrees. When the electrospinning process is performed by using the rotary nozzle mechanism 210 as shown in FIG. 4 or FIG. 11 in conjunction with continuous transportation of the receiving carrier, the polymeric fibrils ejected from the outlet of the nozzle 231 exhibit the circular, elliptic track as shown in FIG. 12, or the wavy track as shown in FIG. 13 on the receiving carrier.

The rotary nozzle mechanism of the present invention utilizes gravitational, electrostatic and centrifugal forces to produce the thinner polymeric fibrils, and a diameter thereof is in a range of 2 to 2000 nm, and a basic weight thereof is equal to 0.3 g/m$^3$ or more.

In the aforementioned examples, the tilt angle of the rotary nozzle mechanism of the present invention is freely adjustable, so that the polymeric fibrils can be formed from any receiving angle, such as horizontal, vertical or any angle, to be piled to form the uniform web on the receiving carrier. However, in another example, the configuration of the receiving carrier 273 and the transporting device 280 as shown in FIG. 4 can be adjusted, so that the receiving carrier 273 can be formed from any receiving angle, such as horizontal, vertical or any angle, so as to pile the polymeric fibrils 277 and form the uniform web onto the receiving carrier 273.

Figure 14:
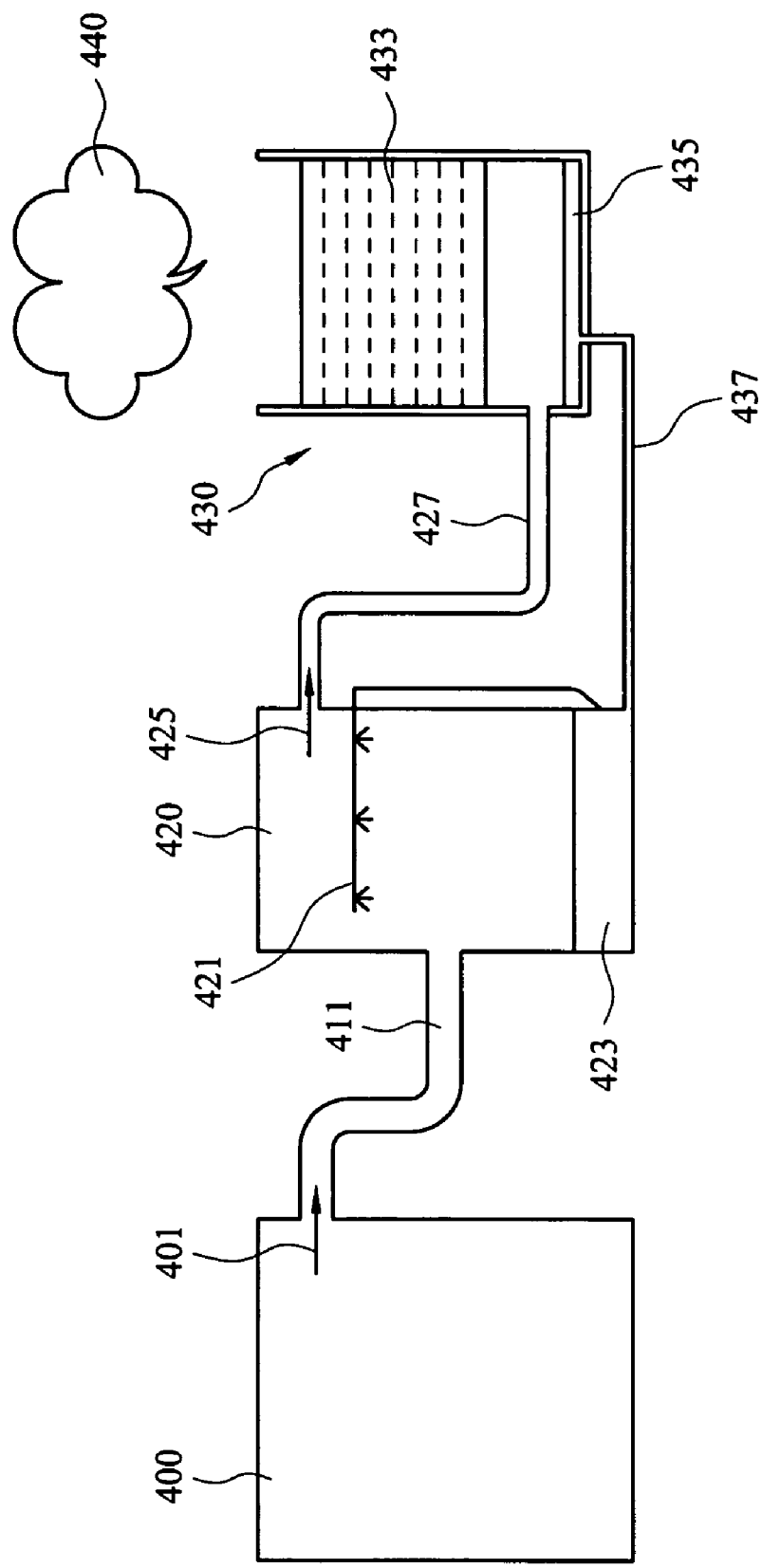
FIG. 14 depicts a schematic diagram of a solvent recycling facility according to a preferred embodiment of the present invention.

Additionally, for satisfying the requirement of environmental protection, a solvent recycling facility can recycle organic solvents used in the process of the polymeric fibrils of the present invention. Reference is made to FIG. 14, which depicts a schematic diagram of a solvent recycling facility according to a preferred embodiment of the present invention. The process of the polymeric fibrils of the present invention can be performed in a closed process chamber 400, and a waste gas that contains organic solvents generated in the process can be transported to a condensation device 420 by a air duct 411 in a direction indicated by an arrow 401, and condense therein. A spray device 421 can be located in the condensation device 420, so that the sprayed stream can condense the waste gas to generate waste water 423 containing organic solvents. The condensed waste gas can be transported to a gas filtration device 430 by a exhaust 427 along to a direction of an arrow 425. In the gas filtration device 430, the condensed waste gas still generates some condensate liquid 435, and the condensate liquid 435 is recycled through a duct 437 into the condensation device 420. The waste is absorbed and filtered by a filter bed 433, and then becomes clean air 440 and is exhausted into the atmosphere directly.

The exemplary electrospinning apparatus and method of manufacturing polymeric fibrils of the present invention is illustrated in conjunction with several following embodiments.

EXAMPLE 1

The nozzles are freely arranged on both ends of the supporting device of the rotary nozzle mechanism of the electrospinning apparatus, where 20-gauge needles, for example, serve as the nozzles and the predetermined height H between the collector and the receiving carrier is, for example, 40 centimeters (cm). A rolling speed of a plane receiving carrier is less than 1 meter per minute. A concentration of the polymer solution is in a ratio such as 15 to 25 weight percent polyacrylonitrile (PAN) to dimethyl formamide (DMF), and preferably, in a ratio of 15 to 20 weight percent. The relationship in ratio and viscosity of the PAN and the DMF is shown in TABLE 1 as follows.

TABLE 1

| PAN/DMF (g/ml) | Concentration (wt %) | Viscosity (cp) |
|---|---|---|
| 15/100 | 15 | 4250 |
| 20/100 | 20 | 12000 |
| 25/100 | 25 | 48000 |

When a voltage of about 40 kilovolts (kV) is applied to the discharging electrode, a web is formed by the polymeric fibrils on the plane receiving carrier, and then dried at room temperature. The polymeric fibrils are less than 0.8 micrometers (μm) in diameter. The motion speed is more than 30 cm per minute in the width of 60 cm. The ejection speed of the polymer solution is less than 5 ml per minute.

EXAMPLE 2

The nozzles are freely arranged on both ends of the supporting device of the rotary nozzle mechanism of the electrospinning apparatus, where 20-gauge needles, for example, serve as the nozzles and the predetermined height H between the collector and the receiving carrier is, for example, 40 cm. A rolling speed of a cylinder receiving carrier is 200 rpm. A concentration of the polymer solution is in a ratio such as 15 weight percent of PAN to DMF.

When a voltage of about 40 kV is applied to the discharging electrode, a web is formed by the polymeric fibrils on the cylinder receiving carrier, and then dried at room temperature. The polymeric fibrils are less than 0.8 μm in diameter. The ejection speed of the polymer solution is 5 ml per minute. The motion speed is about 4.7 cm per minute in the width of 60 cm. The above motion speed is based on a single tube of the polymer solution for manufacturing the polymeric fibrils. When an automatic production is performed, multiple tubes of the polymer solution can be employed for manufacturing the polymeric fibrils. For example, 8 tubes of the polymer solution are used to manufacture the polymeric fibrils, and the motion speed of the polymeric fibrils is up to 37.6 cm per minute in the width of 60 cm.

EXAMPLE 3

The nozzles are freely arranged on both ends of the supporting device of the rotary nozzle mechanism of the electrospinning apparatus, where 20-gauge needles serve as the nozzles and the predetermined height H between the collector and the receiving carrier is, for example, 40 cm. When a voltage of about 40 volts is applied to the discharging electrode, a web is formed by the polymeric fibrils on the three-dimensional receiving carrier. A dioctyl phthalate (DOP) filtration efficiency of the receiving carrier without the web formed thereon is in a range of 40 to 50 percent. However, a filtration efficiency of the receiving carrier with the web formed thereon is raised to 85 to 88 percent.

Therefore, according to the aforementioned preferred embodiments, one advantage of the method of manufacturing polymeric fibrils performed by employing the electrospinning apparatus of the present invention, is the use of the rotary nozzle mechanism moving along a non-linear track, so that the polymeric fibrils can be formed at any receiving angle, such as horizontal, vertical or any angle, to be piled to form the uniform web on the receiving carrier. Therefore, the problems of the prior polymeric fibrils, such as various distribution and slow production rate, can be resolved.

As is understood by a person skilled in the art, the foregoing preferred embodiments of the present invention are illustrated of the present invention rather than limiting of the present invention. It is intended to cover various modifications and similar arrangements included within the spirit and scope of the appended claims. Therefore, the scope of which should be accorded to the broadest interpretation so as to encompass all such modifications and similar structure.

What is claimed is:

1. An electrospinning apparatus, comprising: a rotating shaft configured to spin around an axis thereof;
   at least one rotary supporting device including at least one outlet mounted thereon, the at least one supporting device being pivoted on an end of the rotating shaft, wherein the axis is tilted at a tilt angle in a range of about 0 to 45 degrees with respect to a vertical direction and is configured to revolve around the vertical direction whereby the rotating shaft, when in operation, simultaneously spins around the axis and revolves at the tilt angle around the vertical direction, a discharging electrode is disposed in and electrically connected to the outlet, and the outlet is connected to a duct by which a polymer solution is introduced;
   a receiving carrier; and
   a collector located below the rotary supporting device and having a surface to face the outlet;
   whereby when a voltage is applied to the discharging electrode for ejecting the polymer solution from the outlet, charged polymeric fibrils are formed and piled on the receiving carrier above the collector, while the receiving carrier simultaneously advances along a direction and the outlet moves along a non-linear track, thus forming a web on a surface of the receiving carrier.

2. The electrospinning apparatus according to claim 1, wherein the rotary supporting device is at least one supporting arm.

3. The electrospinning apparatus according to claim 1, wherein the rotary supporting device is a plate.

4. The electrospinning apparatus according to claim 1, wherein the polymer solution is provided from a polymer solution storing tank.

5. The electrospinning apparatus according to claim 1, wherein the non-linear track is a circular track, an elliptic track or a wavy track.

6. The electrospinning apparatus according to claim 1, wherein the outlets are separated from each other by a space, and the space is less than or equal to the rotary supporting device in length.

7. The electrospinning apparatus according to claim 1, wherein a shape of the collector is a dish, a circle, an ellipse, a rectangle, a three-dimensional shape or a combination thereof.

8. The electrospinning apparatus according to claim 1, wherein the surface of the collector has a guiding pore for exhausting air.

9. The electrospinning apparatus according to claim 8, wherein the guiding pore for exhausting air is provided by a hollow structure with pores.

10. The electrospinning apparatus according to claim 9, wherein a material of the structure is selected from the group consisting of a metal and a metal-containing fabric.

11. The electrospinning apparatus according to claim 1, wherein the receiving carrier is located above the collector at a predetermined height, and the predetermined height is in a range of about 0 to 1 meter.

12. The electrospinning apparatus according to claim 1, wherein the surface of the receiving carrier is a plane or a three-dimensional shape.

13. The electrospinning apparatus according to claim 1, wherein the surface of the receiving carrier is perforated.

14. The electrospinning apparatus according to claim 1, further comprising a transporting device for continuously transporting the receiving carrier along the direction.

15. A rotary nozzle mechanism, suitable for an electrospinning apparatus, the rotary nozzle mechanism comprising:
    a rotating shaft configured to spin around an axis thereof; and
    at least one supporting device including at least one outlet mounted thereon, the at least one supporting device being pivoted on an end of the rotating shaft, wherein the axis is tilted at a tilt angle in a range of about 0 to 45 degrees with respect to a vertical direction and is configured to revolve around the vertical direction whereby the rotating shaft, when in operation, simultaneously spins around the axis and revolves at the tilt angle around the vertical direction, and the outlet is electrically connected to a discharging electrode and is connected to a duct by which a polymer solution is introduced;
    whereby when a voltage is applied to the discharging electrode for ejecting the polymer solution from the outlet, charged polymeric fibrils are formed and piled on a receiving carrier above a collector, while the receiving carrier advances simultaneously along a direction and the outlet moves along a non-linear track, thus forming a web on a surface of the receiving carrier.

16. The rotary nozzle mechanism according to claim 15, wherein the supporting device is at least one supporting arm.

17. The rotary nozzle mechanism according to claim 15, wherein the supporting device is a plate.

18. The rotary nozzle mechanism according to claim 15, wherein the outlets are separated from each other by a space, and the space is less than or equal to the supporting device in length.

19. A method of manufacturing polymeric fibrils, comprising:
    providing an electrospinning apparatus comprising
    a rotary nozzle mechanism of claim 15 and a collector located below the supporting device; and applying a voltage to the discharging electrode for ejecting the polymer solution from the outlet, charged polymeric fibrils being formed and piled on a receiving carrier above the collector, while the receiving carrier simultaneously advances along a direction and the outlet moves along a non-linear track, wherein a web is formed on a surface of the receiving carrier.

20. The method of manufacturing polymeric fibrils according to claim 19, wherein the rotary supporting device is at least one supporting arm.

21. The method of manufacturing polymeric fibrils according to claim 19, wherein the rotary supporting device is a plate.

22. The method of manufacturing polymeric fibrils according to claim 19, wherein the polymer solution is provided by a polymer solution storing tank.

23. The method of manufacturing polymeric fibrils according to claim 19, wherein the non-linear track is a circular track, an elliptic track or a wavy track.

24. The method of manufacturing polymeric fibrils according to claim 19, wherein the outlets are separated from each other by a space, and the space is less than or equal to the supporting device in length.

25. The method of manufacturing polymeric fibrils according to claim 19, wherein the polymeric fibrils are about 2 to 2000 nanometers in diameter.

26. The method of manufacturing polymeric fibrils according to claim 19, wherein a shape of the collector is a dish, a circle, an ellipse, a rectangle, a three-dimensional shape or a combination thereof.

27. The method of manufacturing polymeric fibrils according to claim 19, wherein a surface of the collector facing the rotary nozzle mechanism has a guiding pore for exhausting air.

28. The method of manufacturing polymeric fibrils according to claim 27, wherein the guiding pore for exhausting air is provided by a hollow structure with pores.

29. The method of manufacturing polymeric fibrils according to claim 28, wherein a material of the structure is selected from the group consisting of a metal and a metal-containing fabric.

30. The method of manufacturing polymeric fibrils according to claim 19, wherein the receiving carrier is located above the collector at a predetermined height, and the predetermined height is in a range of about 0 to 1 meter.

31. The method of manufacturing polymeric fibrils according to claim 19, wherein the surface of the receiving carrier is a plane or a three-dimensional shape.

32. The method of manufacturing polymeric fibrils according to claim 19, wherein the surface of the receiving carrier is perforated.

33. The method of manufacturing polymeric fibrils according to claim 19, wherein the electrospinning apparatus further comprises a transporting device for continuously transporting the receiving carrier along the direction.

* * * * *